Feb. 9, 1926.  
C. P. MUELLER  
1,572,444  
COMBINATION VASE AND DISPLAY RACK  
Filed Nov. 11, 1924

INVENTOR.  
Charles P. Mueller  
BY  
M. Y. Charles  
ATTORNEY.

Patented Feb. 9, 1926.

1,572,444

UNITED STATES PATENT OFFICE.

CHARLES P. MUELLER, OF WICHITA, KANSAS.

COMBINATION VASE AND DISPLAY RACK.

Application filed November 11, 1924. Serial No. 749,310.

*To all whom it may concern:*

Be it known that I, CHARLES P. MUELLER, a citizen of the United States, residing in Wichita, county of Sedgwick, and State of Kansas, have invented new and useful Improvements in a Combination Vase and Display Rack, reference being had to the accompanying drawings, which form a part of this application.

My invention relates to a combination vase and display rack.

The object of my invention is to provide a vase for cut flowers, which is attractive and not common in appearance.

Another object of my invention is to provide a vase which will receive a flower pot and give the appearance of a stand, rather than a vase.

Another object of my invention is to provide a vase whose sides when laid down sideways, are adapted to receive a flower pot and hold it in a tilted position for display purposes.

Another object of my invention is to provide a vase whose color scheme may be readily varied to blend with other color schemes used in decorating.

Figure 1:
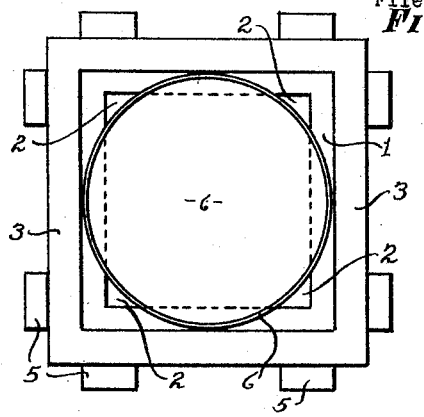
Figure 4:
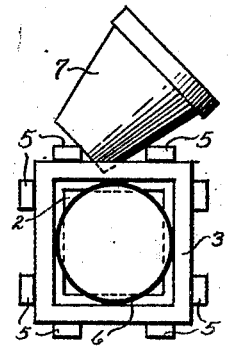
Figure 2:
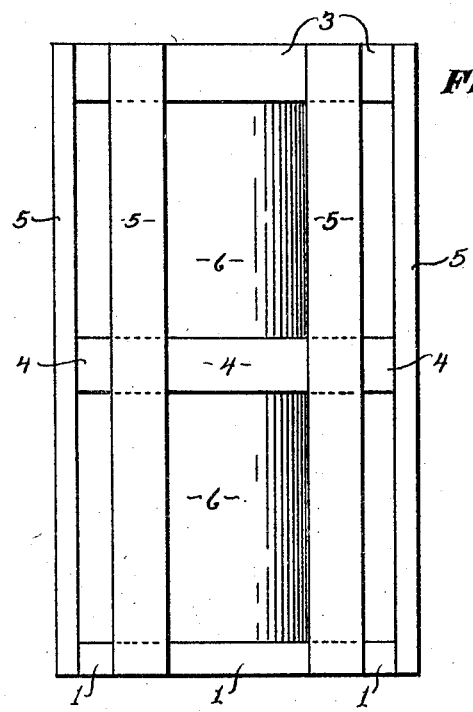
Figure 3:
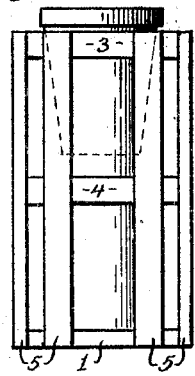

Referring to the drawings, Fig. 1 is a top view of my vase. Fig. 2 is a side view of my vase. Fig. 3 is a side view showing a flower pot placed in a vase which produces the stand effect. Fig. 4 is a view looking at the end of the vase when laid down sideways and showing the flower pot held in a tilted position for display purposes.

My vase is constructed as follows: I make a frame having a bottom 1, whose center is open as shown at 2, a top frame 3, and an intermediate frame 4, the said frames being spaced and supported by slats 5, the dimensions of the opening 2 are less than the opening inclosed by the frames 3 and 4, for the purpose of supporting the bottom of the jar. I then place a can or jar 6 inside the above described frame. The frame may be colored any desired color and the can or jar may be treated likewise, thereby making it possible to produce unique and attractive color schemes. It is readily seen that by removing the can or jar from the frame and replacing it with another can or jar of different color, the color scheme is changed. This is of advantage to florists or window decorators, who wish to work out certain color schemes in their decorations.

The vase as above described is very attractive when cut flowers with long stems are placed in it. If a flower pot with an attractive plant in it is placed in the vase as shown in Fig. 3, it is readily seen that the vase takes on the appearance of an ornamental stand, which is unique and attractive in appearance. The vase may be laid down sideways, and a flower pot tilted and supported between the slats 5 as shown in Fig. 4, which affords an unusual position for a plant to be held in for window display or decorative purposes. The vase beneath the flower pot 7 affords a decorative and ornamental base, supporting the displayed plant held in the pot 7. In making vases of large dimensions, the number of the slats 5 and the frames 4 may be increased, thereby increasing the strength of the vase, also the number of flower pots which may be held in a tilted position for display, as shown in Fig. 4. The frame of this vase may be made in shapes other than square, such as triangular, octagonal, etc.

Such modifications may be employed as lie within the scope of the appended claim, and having fully described my invention, what I claim as new and desire to secure by Letters Patent is:

In a combination vase and display rack, composed of a base frame, an intermediate frame, a top frame, vertical slats attached to said frames, each of said frames having same form except the base frame which is made of wider material than that of the top and intermediate frames, thereby forming a supporting member for a can or jar when placed within the opening surrounded by the top and intermediate member, all for the purpose set forth and described.

CHARLES P. MUELLER.